United States Patent
Kwak et al.

(10) Patent No.: US 11,452,092 B2
(45) Date of Patent: Sep. 20, 2022

(54) METHOD FOR REPORTING CHANNEL STATE INFORMATION IN WIRELESS COMMUNICATION SYSTEM, AND APPARATUS THEREFOR

(71) Applicant: LG ELECTRONICS INC., Seoul (KR)

(72) Inventors: Kyuhwan Kwak, Seoul (KR); Seungmin Lee, Seoul (KR); Hyunho Lee, Seoul (KR); Inkwon Seo, Seoul (KR); Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 209 days.

(21) Appl. No.: 16/628,507

(22) PCT Filed: Jul. 17, 2018

(86) PCT No.: PCT/KR2018/008081
§ 371 (c)(1),
(2) Date: Jan. 3, 2020

(87) PCT Pub. No.: WO2019/017679
PCT Pub. Date: Jan. 24, 2019

(65) Prior Publication Data
US 2020/0221456 A1    Jul. 9, 2020

Related U.S. Application Data

(60) Provisional application No. 62/533,588, filed on Jul. 17, 2017.

(51) Int. Cl.
*H04L 1/00* (2006.01)
*H04W 72/04* (2009.01)
(Continued)

(52) U.S. Cl.
CPC ....... *H04W 72/0446* (2013.01); *H04L 1/1812* (2013.01); *H04L 5/0053* (2013.01)

(58) Field of Classification Search
CPC ............. H04W 72/042; H04W 56/001; H04W 74/006; H04W 74/083; H04W 72/0446;
(Continued)

(56) References Cited

U.S. PATENT DOCUMENTS

2014/0211873 A1    7/2014  Park et al.
2015/0023275 A1*   1/2015  Kim .................. H04W 56/0045
                                                        370/329
(Continued)

FOREIGN PATENT DOCUMENTS

CN           104285466         1/2015

OTHER PUBLICATIONS

PCT International Application No. PCT/KR2018/008081, Written Opinion of the International Searching Authority dated Oct. 18, 2018, 23 pages.
(Continued)

*Primary Examiner* — Diane L Lo
*Assistant Examiner* — Abusayeed M Haque
(74) *Attorney, Agent, or Firm* — Lee, Hong, Degerman, Kang & Waimey PC

(57) ABSTRACT

In the present invention a method for a terminal to report channel state information (CSI) in a wireless communication system is disclosed. More specifically, the method comprises: configuring a plurality of mini-slot sets that are included in slot N−k as a reference resource; and simultaneously reporting to a base station all CSI for the respective plurality of mini-slot sets that are generated based on the reference resource within slot N, wherein the plurality of mini-slot sets comprise a plurality of mini-slots, and wherein k is an integer that is configured by the base station.

14 Claims, 10 Drawing Sheets

(51) Int. Cl.
*H04L 5/00* (2006.01)
*H04L 1/18* (2006.01)

(58) Field of Classification Search
CPC ... H04L 5/0053; H04L 1/0026; H04L 1/0057; H04L 1/1829
See application file for complete search history.

(56) References Cited

U.S. PATENT DOCUMENTS

| | | | |
|---|---|---|---|
| 2016/0352482 A1 | 12/2016 | Sun et al. | |
| 2017/0111815 A1 | 4/2017 | Seo et al. | |
| 2018/0132264 A1* | 5/2018 | Jung | H04L 1/1864 |
| 2019/0215133 A1* | 7/2019 | Pan | H04W 72/0446 |
| 2020/0015251 A1* | 1/2020 | Takeda | H04W 72/1268 |
| 2020/0029308 A1* | 1/2020 | Tiirola | H04W 72/0453 |
| 2020/0119880 A1* | 4/2020 | Liu | H04L 5/0051 |
| 2020/0146039 A1* | 5/2020 | Takeda | H04W 74/08 |
| 2020/0329481 A1* | 10/2020 | Yi | H04W 72/0446 |
| 2021/0168821 A1* | 6/2021 | Chen | H04L 1/203 |

OTHER PUBLICATIONS

NTT DOCOMO, "CSI feedback for shortened TTI with shortened processing time", 3GPP TSG RAN WG1 Meeting #89, R1-1708421, May 2017, 7 pages.
Huawei, et al., "CSI feedback for short TTI", 3GPP TSG RAN WG1 Meeting #89, R1-1706983, May 2017, 3 pages.
LG Electronics, "Discussion on sTTI based CSI", 3GPP TSG RAN WG1 Meeting #89, R1-1707549, May 2017, 3 pages.
Fujitsu, "DL Scheduling and UL control information for URLLC", 3GPP TSG RAN WG1 NR Ad-Hoc Meeting, R1-1700658, Jan. 2017, 4 pages.
European Patent Office Application Serial No. 18835047.4, Search Report dated Mar. 17, 2021, 10 pages.
Qualcomm, "CSI Reporting for Shortened TTI," 3GPP TSG RAN WG1 #89, R1-1708774, May 2017, 3 pages.
Motorola Mobility, "Shortened TTI structure," 3GPP TSG RAN WG1#87, R1-1612739 Nov. 2016, 5 pages.
The State Intellectual Property Office of the People's Republic of China Application Serial No. 201880047761.9, Office Action dated Jan. 5, 2022, 14 pages.

* cited by examiner (A) CONTROL-PLANE PROTOCOL STACK (B) USER-PLANE PROTOCOL STACK (a)

(b)

(a)  (b)

METHOD FOR REPORTING CHANNEL STATE INFORMATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2018/008081, filed on Jul. 17, 2018, which claims the benefit of U.S. Provisional Application No. 62/533,588, filed on Jul. 17, 2017, the contents of which are all hereby incorporated by reference herein in their entirety.

TECHNICAL FIELD

The present disclosure relates to a method for reporting channel state information and apparatus therefor, and more particularly, to a method for reporting channel state information for downlink transmission on a mini-slot basis and apparatus therefor.

BACKGROUND ART

As more and more communication devices demand greater communication traffic as times go by, the next generation 5G system, which is wireless broadband communication, is being required over the existing LTE systems. In the next generation 5G system named New RAT, communication scenarios are classified into Enhanced Mobile Broadband (eMBB), Ultra-reliability and low-latency communication (URLLC), Massive Machine-Type Communications (mMTC), etc.

Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

DISCLOSURE

Technical Problem

The object of the present disclosure is to provide a method for reporting channel state information and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of reporting channel state information (CSI) by a user equipment (UE) in a wireless communication system. The method may include configuring a plurality of mini-slot sets included in a slot N−k as a reference resource and reporting to a base station all CSIs for the plurality of mini-slot sets, which are generated based on the reference resource, in a slot N. Each of the plurality of mini-slot sets may include a plurality of mini-slots, and k may be an integer and configured by the base station.

The CSIs for the plurality of mini-slot sets may be simultaneously reported to the base station in the slot N.

The length of each of the plurality of mini-slot sets may be configured based on a channel coherence time related to a channel variation between the base station and the UE.

Each of the CSIs may include the index of a mini-slot set corresponding to thereto.

The assumption for the number of symbols in the reference resource may be determined based on the number of symbols included in the shortest mini-slot among a plurality of mini-slots included in the slot.

When a mini-slot included in a mini-slot set is not for data transmission, the mini-slot set may be excluded from the reference resource.

A mini-slot set including a mini-slot located before the mini-slot may be configured as the reference resource.

The CSIs for the plurality of mini-slot sets may be generated based on a first target block error rate (BLER) obtained from the base station.

When decoding data transmitted based on the first target BLER fails, the CSIs may be generated and reported based on a second target BLER lower than the first target BLER, and a difference between the first target BLER and the second target BLER may be reported together.

When the value of CSI related to the first target BLER indicates that there is no modulation coding scheme (MCS) and no code rate satisfying the first target BLER, the CSIs may be generated and reported based on a third target BLER higher than the first target BLER, and a difference between the first target BLER and the third target BLER may be reported together.

The CSIs for the plurality of mini-slot sets may be transmitted together with hybrid automatic repeat request-acknowledgements (HARQ-ACKs) for the plurality of mini-slot sets.

When decoding data transmitted based on a final target BLER fails, CSI for a mini-slot set related to the data may be transmitted together with a negative-acknowledgement (NACK) signal for the data.

When the HARQ-ACK for each of the plurality of mini-slot sets is a NACK, CSIs for mini-slot sets for which HARQ-ACKs are NACKs may be transmitted together.

When the HARQ-ACK for each of the plurality of mini-slot sets is an ACK, only the ACK may be transmitted. When the HARQ-ACK for each of the plurality of mini-slot sets is a NACK, only the CSIs for the plurality of mini-slot sets may be transmitted.

In another aspect of the present disclosure, provided herein is a UE for reporting CSI in a wireless communication system. The UE may include a transceiver configured to transmit and receive a signal to and from a base station and a processor connected to the transceiver. The processor may be configured to configure a plurality of mini-slot sets included in a slot N-k as a reference resource and control the transceiver to report, to the base station, all CSIs for the plurality of mini-slot sets, which are generated based on the reference resource, in a slot N. Each of the plurality of mini-slot sets may include a plurality of mini-slots, and k may be an integer and configured by the base station.

Advantageous Effects

According to the present disclosure, when downlink transmission is performed per mini-slot, transmission units of a channel state information-reference signal and CSI may be determined in consideration of a coherence time, thereby reducing signaling overhead and performing efficient CSI feedback.

BEST MODE

Figure 1:
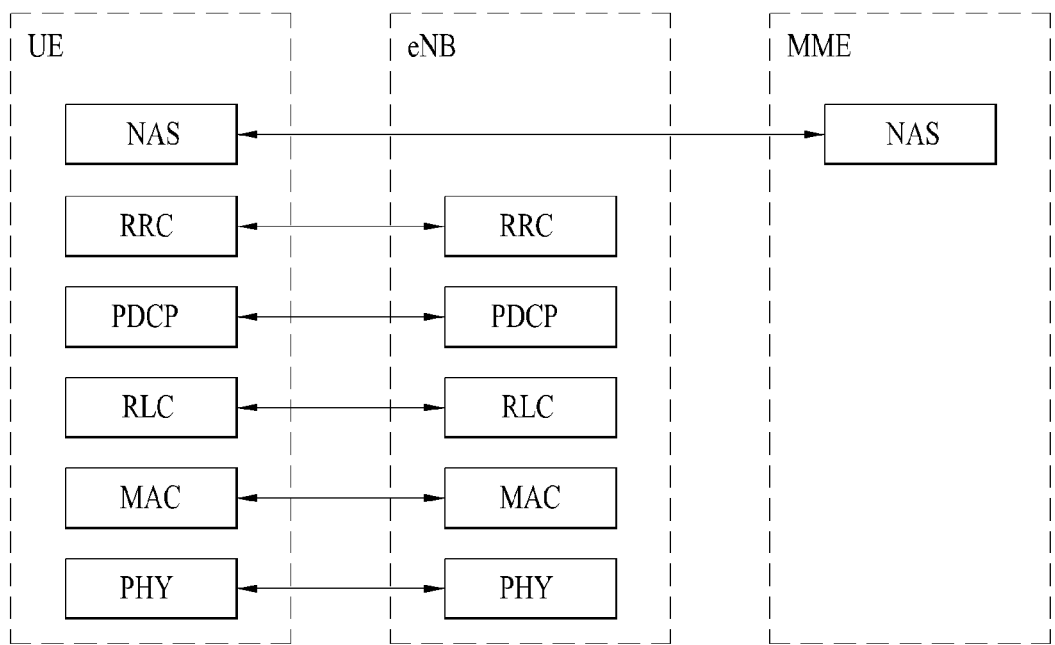
FIG. 1 is a diagram illustrating structures of a control plane and a user plane of a radio interface protocol between a UE and an E-UTRAN based on the 3GPP radio access network specification.
Figure 1:
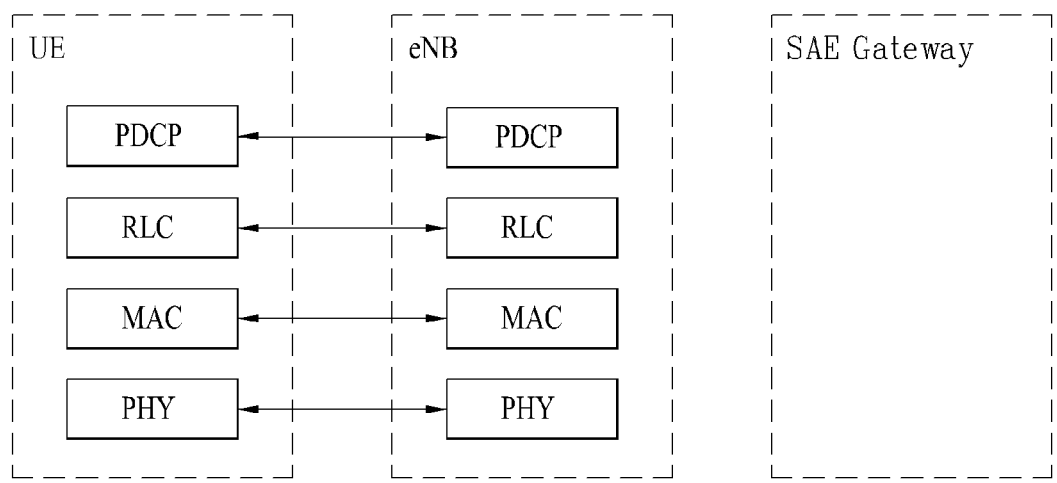

Hereinafter, the structures, operations, and other features of the present disclosure will be understood readily from the embodiments of the present disclosure, examples of which are described with reference to the accompanying drawings. The embodiments which will be described below are examples in which the technical features of the present disclosure are applied to a 3GPP system.

Although the embodiments of the present disclosure will be described based on an LTE system and an LTE-Advanced (LTE-A) system, the LTE system and the LTE-A system are only exemplary and the embodiments of the present disclosure may be applied to all communication systems corresponding to the aforementioned definition.

In the present disclosure, a base station (eNB) may be used as a broad meaning including a remote radio head (RRH), an eNB, a transmission point (TP), a reception point (RP), a relay, etc.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE, and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 2:
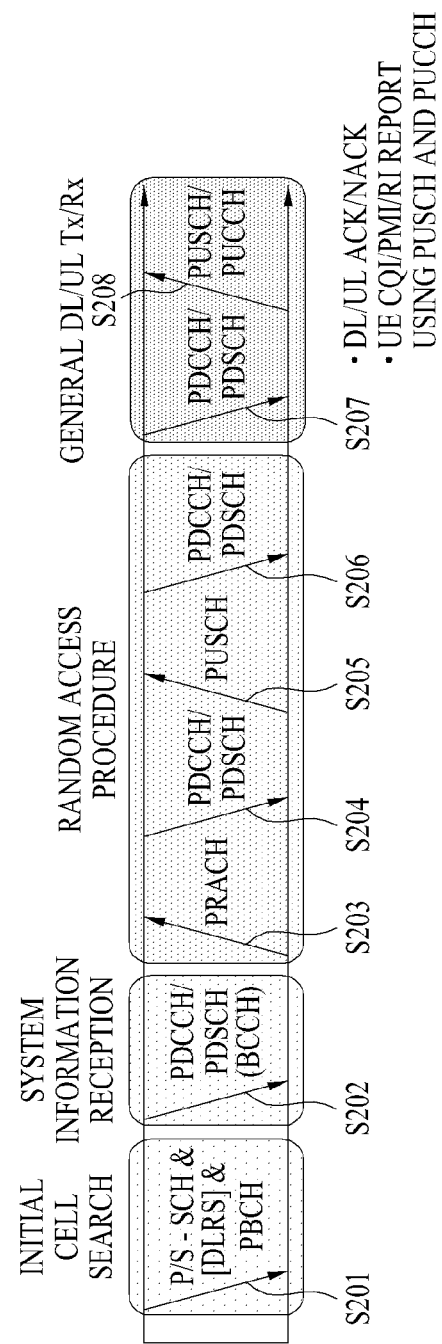
FIG. 2 is a diagram illustrating physical channels used in a 3GPP system and a general signal transmission method using the same.

FIG. 2 is a view illustrating physical channels used in a 3GPP system and a general signal transmission method using the same.

A UE performs initial cell search such as establishment of synchronization with an eNB when power is turned on or the UE enters anew cell (step S201). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S202).

Meanwhile, if the UE initially accesses the eNB or if radio resources for signal transmission are not present, the UE may perform a random access procedure (steps S203 to S206) with respect to the eNB. To this end, the UE may transmit a specific sequence through a Physical Random Access Channel (PRACH) as a preamble (steps S203 and S205), and receive a response message to the preamble through the PDCCH and the PDSCH corresponding thereto (steps S204 and S206). In the case of a contention-based RACH, a contention resolution procedure may be additionally performed.

The UE which performs the above procedures may receive a PDCCH/PDSCH (step S207) and transmit a Physical Uplink Shared Channel (PUSCH)/Physical Uplink Control Channel (PUCCH) (step S208) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink acknowledgment/Negative-acknowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

<OFDM Numerology>

The new RAT system uses an OFDM transmission scheme or a transmission scheme similar thereto. The new RAT system may use OFDM parameters different from those of LTE. Alternatively, the new RAT system may follow the numerology of legacy LTE/LTE-A but have a larger system bandwidth (e.g., 100 MHz). Further, one cell may support a plurality of numerologies. That is, UEs operating based on different numerologies may coexist within one cell.

<Subframe Structure>

In the 3GPP LTE/LTE-A system, a radio frame has a length of 10 ms (307200 $T_s$) and includes 10 subframes (SFs) with the same size. All of the 10 SFs in one radio frame may be numbered. Here, $T_s$ denotes a sampling time and is expressed as $T_s=1/(2048*15$ kHz). Each SF has a length of 1 ms and includes two slots. All of the 20 slots in one radio frame may be sequentially numbered from 0 to 19, and each slot has a length of 0.5 ms. The time required to transmit one SF is defined as a transmission time interval (TTI). Time resources may be distinguished by a radio frame number (or radio frame index), an SF number (or SF index), a slot number (or slot index), etc. The TTI refers to an interval for data scheduling. In the current LTE/LTE-A system, the transmission opportunity of a UL or DL grant is present every 1 ms, for example. That is, no multiple UL/DL grant opportunities are given within a time shorter than 1 ms. Accordingly, the TTI is 1 ms in the legacy LTE/LTE-A system.

Figure 3:
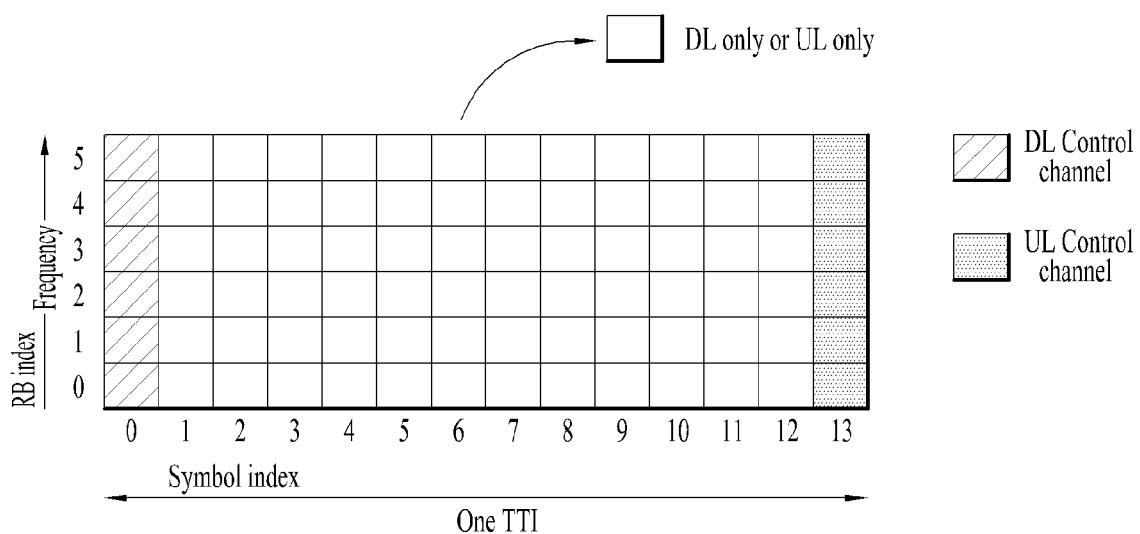
FIG. 3 shows an exemplary slot structure usable for a New Radio access technology (NR).
Figure 3:
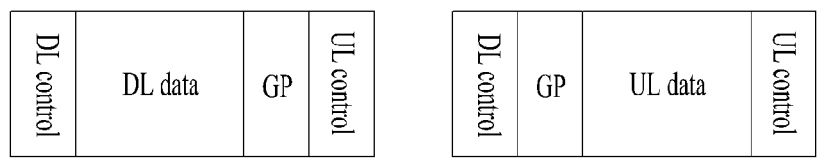

FIG. 3 shows an exemplary slot structure available in new radio access technology (NR).

In order to minimize the delay of data transmission, the NR system considers a slot structure in which a control channel and a data channel are TDMed (time-division-multiplexed).

In FIG. 3 (a), the hatched area represents a transmission region of a DL control channel carrying DCI (e.g., PDCCH), and the black area represents a transmission region of a UL control channel carrying UCI (e.g., PUCCH). Here, the DCI is control information transmitted from a gNB to a UE and may include information on a cell configuration the UE should know, DL-specific information such as DL scheduling, UL-specific information such as a UL grant, etc. The UCI is control information transmitted from the UE to the gNB and may include a HARQ ACK/NACK report on DL data, a CSI report on a DL channel state, a scheduling request (SR), etc.

In FIG. 3 (a), symbols from symbol index 1 to symbol index 12 may be used to transmit a physical channel carrying DL data (e.g., PDSCH) or transmit a physical channel carrying UL data (e.g., PUSCH). According to the slot structure shown in FIG. 2, since DL transmission and UL transmission are sequentially performed within one slot, transmission/reception of DL data and reception/transmission of a UL ACK/NACK for the DL data may be performed within the one slot. That is, the structure may reduce the time required to retransmit data when a data transmission error occurs, thereby minimizing the latency of final data transmission.

In the slot structure, a time gap is necessary in order that the gNB and UE switch to a reception mode from a transmission mode, and vice versa. For the switching between the transmission mode and the reception mode, some OFDM symbols at the time of DL-to-UL switching may be configured as a guard period (GP) in the slot structure.

As shown in FIG. 3 (b), when the data region in a slot is used for DL data, the GP may be configured between the DL data region and the UL control channel region. When the data region in the slot is used for UL data, the GP may be configured between the DL control channel region and the UL data region. By doing so, the time gap for switching between the transmission and reception modes may be configured.

In the legacy LTE/LTE-A system, a DL control channel is TDMed with a data channel, and, and the PDCCH, which is a control channel, is distributed and transmitted over the entire system band. However, since it is expected that the bandwidth of a system increases to at least about 100 MHz in the new RAT, it may be less feasible to transmit a control channel over the entire band. If the UE monitors the entire band to receive a DL control channel for the purpose of data transmission/reception, it may increase the battery consumption of the UE and degrade the efficiency thereof. Thus, the present disclosure proposes to transmit a DL control channel by localizing or distributing the DL control channel to or over a partial frequency band of the system band, i.e., channel band.

In the NR system, the basic transmission unit is a slot. The duration of the slot may be configured with 14 symbols having a normal cyclic prefix (CP) or 12 symbols having an extended CP. The slot is a function of a used subcarrier spacing and scaled by time. That is, as the subcarrier spacing increases, the length of the slot decreases. For example, assuming that the number of symbols per slot is 14, if the number of slots in a 10 ms frame is 10 for a subcarrier spacing of 15 kHz, the number of slots increases to 20 for a subcarrier spacing of 30 kHz and 40 for a subcarrier spacing of 60 kHz. As the subcarrier spacing increases, the length of an OFDM symbol decreases. The number of OFDM symbols in the slot varies depending on whether the normal CP or extended CP is used but does not change depending on the subcarrier spacing. The basic time unit for LTE, $T_s$ is defined as $T_s=1/(15000*2048)$ seconds in consideration of a basic subcarrier spacing of 15 kHz and a maximum FFT size of 2048 in the LTE. The basic time unit $T_s$ is also used as a sampling time for the 15 kHz subcarrier spacing. In the NR system, various subcarrier spacings including the 15 kHz subcarrier spacing are available, and since the subcarrier spacing is inversely proportional to a corresponding time length, the actual sampling time for subcarrier spacings larger than 15 kHz becomes shorter than $T_s=1/(15000*2048)$ seconds. For example, the actual sampling time for subcarrier spacings of 30 kHz, 60 kHz, and 120 kHz may be $1/(2*15000*2048)$ seconds, $1/(4*15000*2048)$ seconds, and $1/(8*15000*2048)$ seconds, respectively.

<Analog Beamforming)>

A fifth-generation (5G) mobile communication system under discussion is considering the use of an ultra-high frequency band, that is, a millimeter frequency band equal to or higher than 6 GHz in order to transmit data to a plurality of users in a wide frequency band while maintaining a high transmission rate. In 3GPP, this technology is called "NR", and thus the 5G mobile communication system is referred to as the NR system in the present disclosure. However, the millimeter frequency band has the following frequency characteristics: a signal is rapidly attenuated depending on distance due to the use of too high a frequency band. Therefore, the NR system using a frequency band equal to or higher than 6 GHz employs a narrow beam transmission scheme in which signal transmission is performed based on energy concentration in a specific direction rather than omni-directionally to compensate for rapid propagation attenuation and thus overcome the decrease in coverage caused by the rapid propagation attenuation. However, if a service is provided using only one narrow beam, the coverage of a base station (or gNB) decreases, and thus the base station provides the service in a wideband by collecting a plurality of narrow beams.

In the millimeter frequency band, that is, millimeter wave (mmW) band, since a wavelength is shortened, a plurality of antenna elements may be installed in the same area. That is, considering that the wavelength at 30 GHz band is 1 cm, a total of 100 antenna elements may be installed in a 5 by 5 cm panel at intervals of 0.5 lambda (wavelength) in the case of a 2-dimensional array. Therefore, in the mmW, the coverage or throughput may be improved by increasing the beamforming gain using multiple antenna elements.

To create a narrow beam in the millimeter frequency band, a beamforming method is mainly considered. According to the beamforming method, the base station or UE transmits the same signals with appropriate phase differences through multiple antennas to thereby increase energy only in a specific direction. Beamforming methods include digital beamforming for creating a phase difference between digital baseband signals, analog beamforming for creating a phase difference between modulated analog signals based on time delays (i.e., cyclic shifts), and hybrid beamforming using both the digital beamforming and analog beamforming. If a transceiver unit (TXRU) is provided to each antenna element to enable adjustment of transmit power and phase per antenna element, beamforming may be performed independently for each frequency resource. However, installing TXRUs in all of the about 100 antenna elements is less feasible in terms of cost. That is, considering that multiple antennas needs to be used to compensate for the rapid propagation attenuation in the millimeter frequency band, and the digital beamforming requires as many RF components (e.g., digital to analog converters (DACs), mixers, power amplifiers, and linear amplifiers) as the number of antennas, the implementation of the digital beamforming in the millimeter frequency band faces the following problem: the cost of communication devices increases. Therefore, when a large number of antennas are required as in the millimeter frequency band, the analog beamforming or the hybrid beamforming is considered. In the analog beamforming, multiple antenna elements are mapped to one TXRU, and the direction of a beam is controlled by an analog phase shifter. However, the analog beamforming is disadvantageous in that frequency selective beamforming (BF) is not provided because only one beam direction is generated over the entire band. As an intermediate form between the digital BF and analog BF, the hybrid BF has B TXRUs fewer than Q antenna elements. In the case of the hybrid BF, the directions of beams transmittable at the same time is limited to B or less although the number of beam directions depends on how B TXRUs and Q antenna elements are connected.

Figure 4:
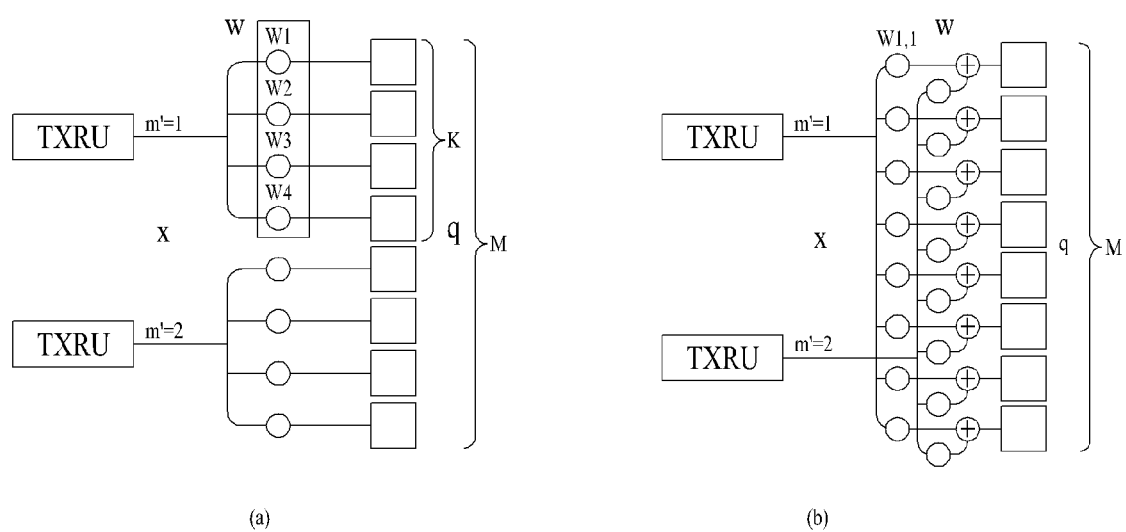
FIG. 4 illustrates examples of a connection mode of TXRU and an antenna element.

FIG. 4 illustrates methods for connecting a TXRU to an antenna element.

Figure 5:
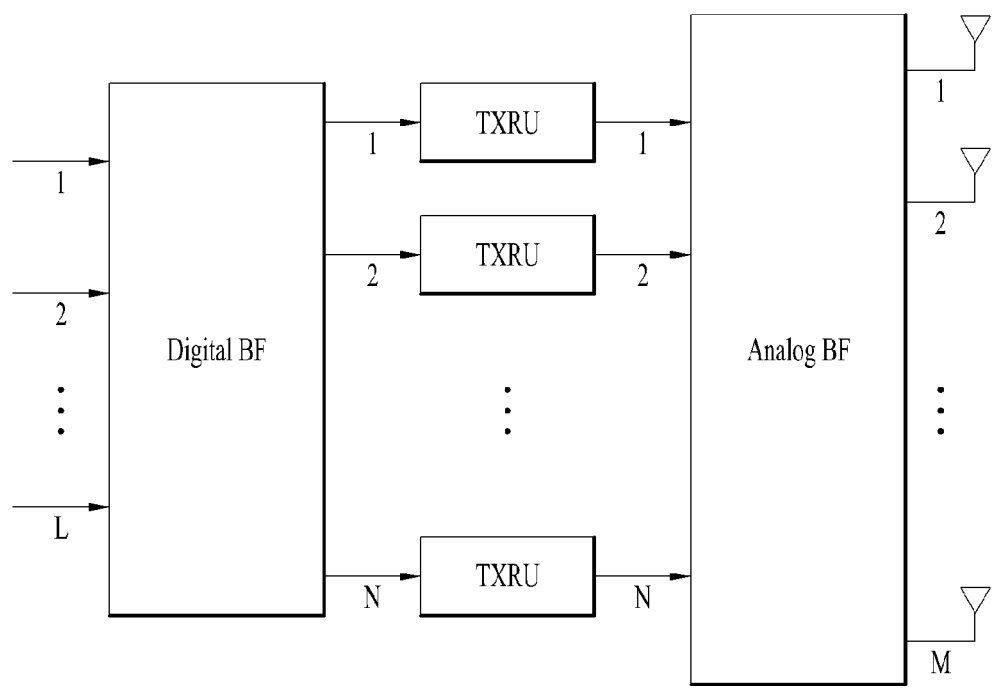
FIG. 5 abstractly shows a hybrid beamforming structure in aspects of Transceiver Unit (TXRU) and physical antenna.

Specifically, FIG. 4 (a) illustrates a connection between a TXRU and a sub-array. In this case, the antenna element is connected only to one TXRU. In contrast, FIG. 4 (b) illustrates a connection between a TXRU and all antenna elements. In this case, the antenna element is connected to all TXRUs. In FIG. 5, W denotes a phase vector subjected to multiplication by an analog phase shifter. That is, the analog BF direction is determined by W. Here, the mapping relationship between CSI-RS antenna ports and TXRUs may be a one-to-one or one-to-many relationship.

In the digital BF, since a digital baseband signal to be transmitted or a received digital baseband signal is signal-processed, signals may be transmitted or received simultaneously in multiple directions using multiple beams as described above. In contrast, in the analog BF, since an analog signal to be transmitted or a received analog signal is beamformed after being modulated, signals may not be transmitted or received simultaneously in multiple directions beyond the coverage of one beam. Typically, the base station communicates with multiple users at the same time based on the wideband transmission or multi-antenna characteristics. If the base station uses the analog BF or hybrid BF and forms an analog beam in one beam direction, the gNB has no other way than to communicate only with users located along the same analog beam direction due to the feature of the analog BF. The RACH resource allocation and resource utilization method for a base station according to the present disclosure, which will be described later, is proposed by considering the restrictions due to the features of the analog or hybrid BF.

<Hybrid Analog Beamforming>

FIG. 5 abstractly illustrates a hybrid beamforming structure in terms of TXRUs and physical antennas.

Figure 6:
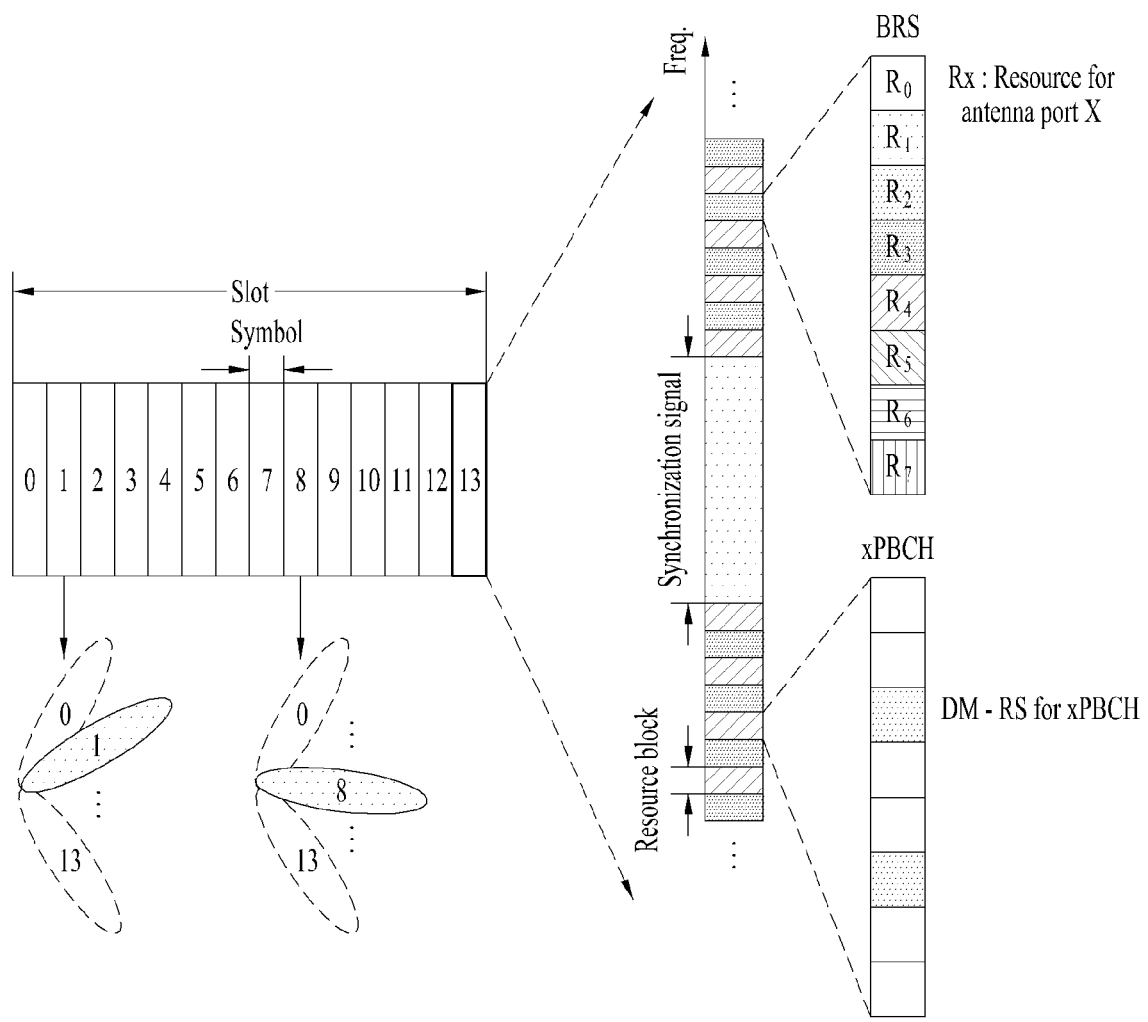
FIG. 6 illustrates beam sweeping operation for a synchronization signal and system information during downlink transmission.

For a case where multiple antennas are used, the hybrid BF obtained by combining the digital BF and the analog BF has been introduced. The analog BF (or RF BF) is an operation of performing precoding (or combining) in an RF unit. The hybrid BF is advantageous in that it guarantees performance similar to that of the digital BF while reducing the number of RF chains and the number of DACs (or analog to digital converters (ADCs) since precoding (combining) is performed by both a baseband unit and an RF unit. For convenience, a hybrid BF structure may be represented by N TXRUs and M physical antennas. The digital BF for L data layers to be transmitted by a transmission end may be represented as an N-by-N matrix. In addition, N converted digital signals are converted to analog signals through TXRUs and then subjected to the analog BF represented as an M-by-N matrix. In FIG. 6, the number of digital beams is L, and the number of analog beams is N. Further, it is considered in the NR system that the base station is configured to be capable of changing the analog BF on a symbol basis to support more efficient BF for UEs in a specific area. When one antenna panel is defined by N TXRUs and M RF antennas, the introduction of a plurality of antenna panels to which independent hybrid BF is applicable is also considered. When the base station uses a plurality of analog beams, each UE may prefer a different analog beam for signal reception. Therefore, a beam sweeping operation in which for at least an SS, system information, paging, etc., the base station changes a plurality of analog beams on a symbol basis in a specific slot or SF to allow all UEs to have reception opportunities is considered.

Figure 7:
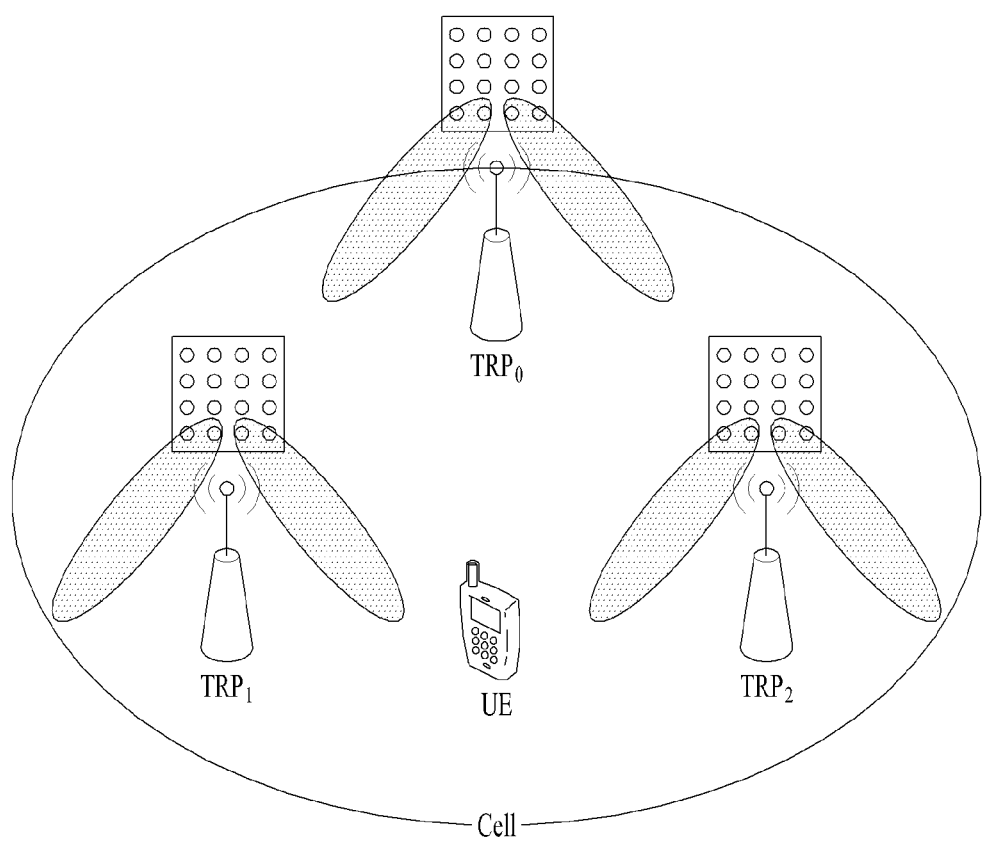
FIG. 7 illustrates a cell of a new radio access technology (NR) system.

FIG. 6 illustrates beam sweeping operation for an SS and system information during DL transmission. In FIG. 6, a physical resource or channel for broadcasting system information of the NR system is referred to as a physical broadcast channel (xPBCH). Analog beams from different antenna panels may be simultaneously transmitted in one symbol, and the introduction of a beam reference signal (BRS), that is, an RS transmitted for a single analog beam corresponding to a specific antenna panel as illustrated in FIG. 7 is under discussion to measure a channel per analog beam. The BRS may be defined for a plurality of antenna ports, and each antenna port of the BRS may correspond to a single analog beam. In contrast to the BRS, the SS or xPBCH may be transmitted for all analog beams included in an analog beam group so that any UE may receive the SS or the xPBCH successfully.

FIG. 7 shows an exemplary cell of a New Radio access technology (NR) system.

Referring to FIG. 7, in a NR system, unlike that one BS forms one cell in a wireless communication system such as the existing LTE or the like, a scheme that a plurality of Transmission Reception Points (TRPs) form one cell is under discussion. If a plurality of TRPs form one cell, although a RTP that services a UE is changed, seamless communication is possible. Hence, mobility management of a UE is advantageously facilitated.

In the LTE/LTE-A system, PSS/SSS is transmitted in omni-directions. Unlike this, in the NR system, a following method is considered. Namely, a gNB applying mmWave performs a beamforming on a signal such as PSS, SSS, PBCH or the like by turning a direction of a beam omni-directionally and then transmits the corresponding signal. In doing so, transceiving a signal by turning a beam direction is referred to as a beam sweeping or a beam scanning. In the present disclosure, 'beam sweeping' indicates an operation of a transmitter side and 'beam scanning' indicates an operation of a receiver side. For example, assuming that a gNB is capable of having maximum N beam directions, the gNB transmits signals of PSS/SSS/PBCH and the like in the N beam directions, respectively. Namely, the gNB transmits synchronization signals of PSS/SSS/PBCH and the like in the respective directions. Or, if the gNB is capable of forming N beams, a plurality of beams may be bundled into a single beam group and PSS/SSS/PBCH may be transmitted and received per beam group. In this case, one beam group includes one or more beams. A signal of PSS/SSS/PBCH or the like transmitted in the same direction may be defined as one SS block and a plurality of SS blocks may exist within a cell. In case that a plurality of SS blocks exist, an SS block index may be used to identify each SS block. For example, when PSS/SSS/PBCH is transmitted in 10 beam directions in a single system, PSS/SSS/PBCH in the same direction may configure one SS block and 10 SS blocks may be understood as existing in the corresponding system.

<Channel State Information (CSI) Reporting>

In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal CSI is divided into three types of information: a Rank Indicator (RI), a Precoding Matrix Index (PMI), and a Channel Quality Indicator (CQI). First, RI is information on a channel rank as described above and indicates the number of streams that may be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 1:

$$W = \text{norm}(W1\,W2) \qquad \text{[Equation 1]}$$

In Equation 1, W2 of a short-term PMI indicates a codeword of a codebook configured to reflect short-term channel information, W denotes a codeword of a final codebook, and norm (A) indicates a matrix in which a norm of each column of a matrix A is normalized to 1.

The detailed configurations of W1 and W2 are shown in Equation 2:

$$W1(i) = \begin{bmatrix} X_i & 0 \\ 0 & X_i \end{bmatrix}, \text{ where } X_i \text{ is } Nt/2 \text{ by } M \text{ matrix.} \qquad \text{[Equation 2]}$$

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r \text{ columns}} (\text{if rank} = r),$$

where $1 \le k, l, m \le M$ and $k, l, m$ are integer.

In Equation 2, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \qquad \text{[Equation 3]}$$

In Equation 3, a codeword is expressed as a vector of $N_T \times 1$ (where NT is the number of Tx antennas) and is structured with an upper vector $x_i(k)$ and a lower vector $\alpha_j x_i(k)$ which show correlation characteristics of a horizontal antenna group and a vertical antenna group, respectively. $x_i(k)$ is preferably expressed as a vector having the characteristics of linear phase increment by reflecting the characteristics of a correlation between antennas of each antenna group and may be a DFT matrix as a representative example.

In an advanced system such as the LTE-A system, additional multi-user diversity may be obtained from multi-user MIMO (MU-MIMO). In the MU-MIMO, the accuracy of CSI may significantly affect interference to other multiplexed UEs as well as a UE reporting the CSI due to interference between UEs multiplexed in the antenna domain. Accordingly, the MU-MIMO requires CSI reporting more accurate than that in single-user MIMO (SU-MIMO).

In coordinated multi-point joint transmission (CoMP JT), since multiple base stations cooperatively transmits the same data to a specific UE, it may be theoretically regarded as the MIMO system where antennas are geographically distributed. That is, even when the MU-MIMO is applied to the JT, highly accurate CSI is required to avoid interference between co-scheduled UEs as in a single cell MU-MIMO operation. The accurate CSI is also required for CoMP coordinate beamforming (CB) to prevent a neighboring cell from causing interference to a serving cell. In general, the UE needs to report additional CSI feedback to improve the accuracy of CSI feedback. The additional CSI feedback may be transmitted to the base station on the PUCCH or PUSCH.

<Reference Signal>

In general, an RS known to both transmitting and receiving ends is transmitted together with data from the transmitting end to the receiving end for channel measurement. The RS includes information on a modulation scheme as well as information for channel measurement to assist to perform a demodulation process. The RS is divided into: a dedicated RS (DRS) for a base station and a specific UE, i.e., a UE-specific RS; and a cell-specific RS (CRS) for all UEs in a cell, i.e., a common RS. In addition, the CRS includes an RS used by a UE to measure CQI/PMI/RI and report the same to a base station, which is referred to as a channel state information RS (CSI-RS).

<CSI Feedback Method in Consideration of Channel Configuration on Mini-Slot Basis>

The main purpose of the next-generation radio access technology (NR) is to provide faster and more reliable services to more users then the legacy system based on URLLC. To this end, technologies for reducing a communication time delay are under discussion. In particular, communication services including machine type communication of connecting multiple devices and things are currently discussed.

To reduce the communication time delay, the self-contained SF structure shown in FIG. 3 has been introduced in the NR system. In the NR system, the SF structure may be referred to as "slot", and various types of slots may be configured. For example, one slot may be configured with a combination of different channels such as a DL control channel, a DL data channel, a GP, a UL control channel, and a UL data channel.

For URLLC transmission, a channel may be configured on a mini-slot basis, where a mini-slot is smaller than a slot. For example, the mini-slot may be composed of two symbols and defined as a TTI, and a control or data channel may be transmitted and received on the mini-slot basis.

Accordingly, a CSI reporting method suitable for channel transmission and reception on the mini-slot basis needs to be considered. Therefore, the present disclosure proposes an efficient CSI feedback method suitable for URLLC.

As an example of the efficient CSI feedback method, when a channel is configured on the mini-slot basis in the NR system, a CSI feedback method suitable for scheduling on a shortened-TTI basis may be considered. To this end, a method of transmitting a CSI-RS on a basis smaller than 1 ms in LTE may be considered. For example, considering that a channel is configured on the mini-slot basis according to the present disclosure, a method of transmitting a CSI-RS on the mini-slot basis may also be considered.

However, when the mini-slot is very short, for example, when the mini-slot is composed of one or two symbols, if the CSI-RS is transmitted on the mini-slot basis, CSI-RS transmission overhead may excessively increase. In addition, if the length of a period in which channels significantly vary, that is, a channel coherence time period is longer than the mini-slot, transmitting the CSI-RS on the mini-slot basis may be undesirable in terms of efficiency.

Figure 8:
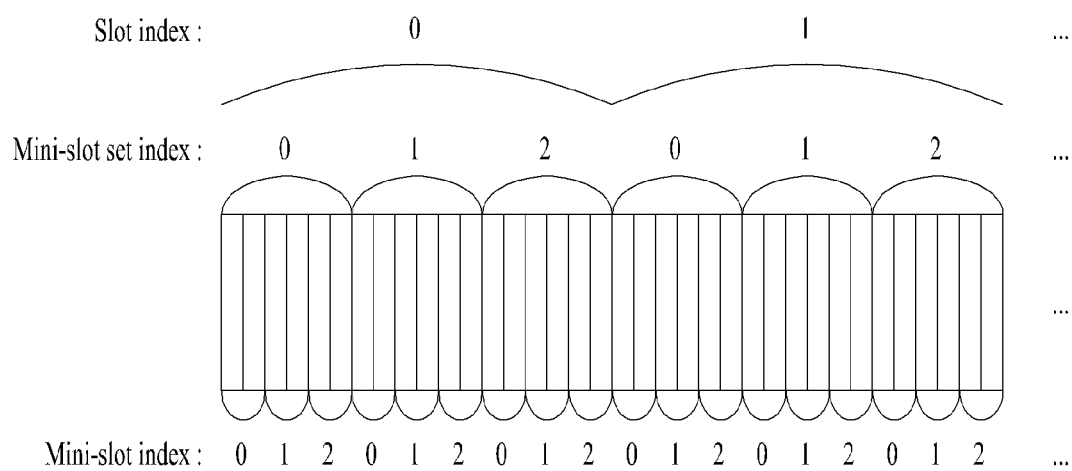
FIG. 8 is a diagram for explaining configurations of a mini-slot, a mini-slot set, and a slot according to embodiments of the present disclosure.

In this case, as shown in FIG. 8, multiple mini-slots may be grouped into one set, and the CSI-RS may be transmitted on a mini-slot set basis. In this case, the base station may configure the number of mini-slots included in the mini-slot set based on the channel coherence time and then provide it to the UE through higher layer signaling and/or physical layer signaling.

In addition, the base station may configure the transmission location of the CSI-RS within the slot or mini-slot set based on resource scheduling and then provide it to the UE through higher layer signaling and/or physical layer signaling. For example, the base station may signal to the UE the index of a mini-slot in the mini-slot set where the CSI-RS is transmitted or the index of a symbol in the mini-slot where the CSI-RS is transmitted.

When the CSI-RS is transmitted on a mini-slot-set basis as described above, if CSI feedback is performed by considering the length of a period where channels vary, aside from scheduling the channels on the mini-slot basis for the URLLC transmission, the CSI feedback may become more suitable for the URLLC. However, the index numbering and the number of mini-slot sets per slot, and the number of mini-slots per mini-slot set shown in FIG. 8 are merely exemplary, and thus, it is apparent that the present disclosure is not limited to the example illustrated in FIG. 8.

Figure 9:
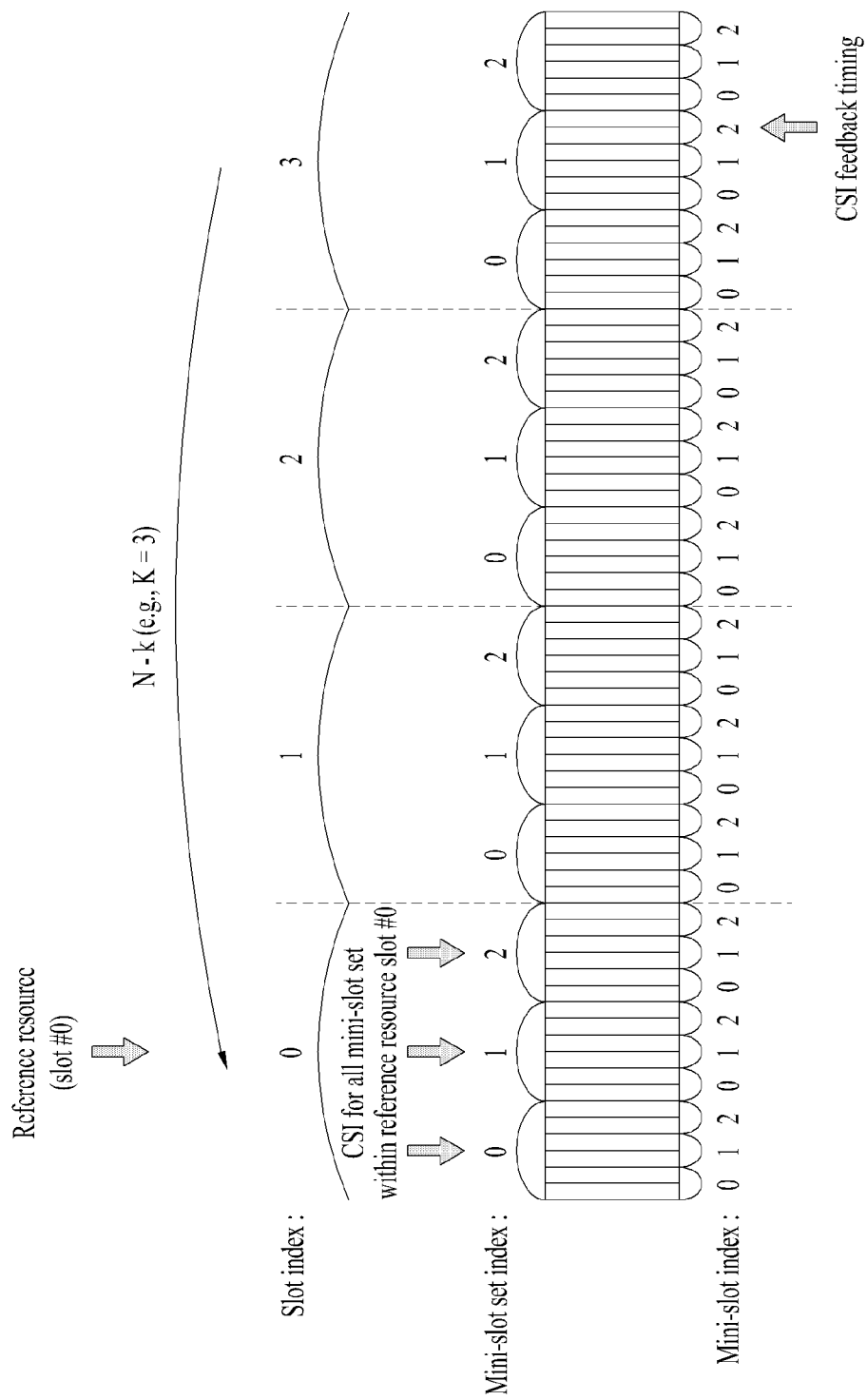
FIG. 9 is a diagram for explaining a channel state information reporting method according to embodiments of the present disclosure.

Referring to FIG. 9, a reference resource for performing the CSI feedback, that is, a reference resource may be designated as a slot N–k (where k is an integer equal to or more than 0) with respect to a slot N where the CSI feedback is to be performed. If the reference resource is designated on the mini-slot or mini-slot set basis, the CSI feedback may be performed in a mini-slot or mini-slot set N–k (where k is an integer equal to or more than 0) with respect to a mini-slot or mini-slot set where the CSI feedback is to be performed. The value of k may be predefined in the system or vary depending on the capability or channel environment of the UE. When the value of k changes, the base station may inform the UE of the changed value through higher layer signaling and/or physical layer signaling.

If the reference resource is designated with respect to the slot, all CSI for multiple mini-slot sets in one slot may be fed back within the one slot. If multiple mini-slots/slots/mini-slot sets, which are all fed back in the same CSI feedback timing, have different characteristics, it needs to be considered how the CSI feedback is to be performed. For example, when a slot is composed of 14 symbols and 6 mini-slots in the slot includes three, two, two, two, two, and three symbols, respectively, the length of a reference resource may be assumed to be equal to the length of the shortest mini-slot, two symbols. That is, when the CQI is calculated for the CSI feedback by setting a resource at a time N–K as the reference resource, the length of the resource may be assumed to be 2 in the above example.

When the first mini-slot in the slot is allocated for other signals or channels rather than a data channel, data may not be transmitted in the mini-slot. In this case, a mini-slot prior to the corresponding mini-slot may be designated as the reference resource, that is, the corresponding mini-slot is excluded therefrom. For example, when 6 mini-slots in one slot include three, two, two, two, two, and three symbols, respectively; the assumption for the first mini-slot among mini-slots designated as the reference resource may follow a PCFICH configuration. In this case, if the first mini-slot is all used for control channel transmission since three symbols are allocated for a PCFICH, the corresponding mini-slot may be excluded from the reference resource, and a mini-slot prior to the corresponding mini-slot may be designated as the reference resource. Meanwhile, when the reference resource is configured on the mini-slot set basis, if a specific mini-slot in the mini-slot set is all used for transmitting a control channel, the mini-slot set including the corresponding mini-slot may be excluded from the reference resource, and a mini-slot set prior to the corresponding mini-slot set may be designated as the reference resource.

When the CSI feedback is performed, the index of the mini-slot set may be transmitted together with the CSI to provide information on which CSI is for which mini-slot set. In this case, since the CSI is reported for each mini-slot set, an appropriate MCS/PMI/RI may be applied based on the interference characteristics of each mini-slot set. In particular, the optimal MCS/PMI/RI may be applied based on a mini-slot set to which a mini-slot to be used for scheduling for the URLLC transmission belongs.

Meanwhile, when CSI for multiple mini-slot sets is reported, CSI for top M mini-slot sets with best channel states may be fed back, instead of transmitting CSI for all mini-slot sets. In this case, the indices of the mini-slot sets may be transmitted together. The value of M may be predefined in the system. Alternatively, the base station may configure a proper value of M based on the performance or transmission environment of the UE and then inform the UE of the value through higher layer signaling and/or physical layer signaling.

As another example, CSI for a mini-slot set with the worst channel state may be transmitted, or CSI for bottom M' mini-slot sets with worst channel states may be fed back. Alternatively, the average value for all mini-slot sets (all channel states), the average value for the top M mini-slot sets, or the average value for the bottom M' mini-slot sets may be fed back. Further, a CSI value only for at least one mini-slot set configured by the base station through higher layer signaling and/or physical layer signaling may be fed back.

In the above examples, the base station may inform the UE which value needs to be transmitted through higher layer signaling and/or physical layer signaling. If the reference resource is designated with respect to the mini-slot set, CSI for previous mini-slot sets with respect to the mini-slot set designated as the reference resource may be transmitted in the same way as described above.

In this case, the multiple mini-slot sets corresponding to the reported CSI may not belong to one slot. That is, the CSI values of mini-slot sets belonging to two or more different slots may be reported together.

Although the present disclosure is described on the assumption that the CSI is transmitted on the mini-slot set basis, the disclosure is also applicable when the CSI is transmitted on the mini-slot basis. That is, if the 'slot' is replaced with 'mini-slot set' and the mini-slot set' is replaced with the 'mini-slot' in the above examples, the CSI may be reported in the same way as described above.

It may be considered in the NR system that the length of the mini-slot changes instead of being fixed. In this case, when selecting the reference resource, the base station may inform the UE how many symbols are present between the CSI feedback reporting time and the reference resource. In other words, the unit of k of (N−k) in the above examples may correspond to a symbol. The base station may inform the UE of this configuration through higher layer signaling and/or physical layer signaling. Since the length of a slot, mini-slot set, or mini-slot designated as the reference resource may change, the base station may inform the UE of the length of a TTI designated as the reference resource through higher layer signaling and/or physical layer signaling.

Meanwhile, adaptive HARQ transmission may be considered to achieve a very low target block error rate (BLER) within a limited delay for the URLLC. For example, the adaptive HARQ transmission may be considered to achieve the target BLER within a limited number of times of HARQ retransmission. To this end, the CSI may be fed back together when a HARQ-ACK is transmitted. In this case, the UE may implicitly recognize a resource used for initial transmission as a CSI reference resource and then feed back the CSI at the corresponding time to the base station.

If the NR system aims to achieve the very low final target BLER for the URLLC through multiple retransmission attempts, the base station may inform the UE whether the initial transmission is performed with respect to the final target BLER and/or the maximum number of times of retransmission through higher layer signaling and/or physical layer signaling. In this case, if the UE fails in decoding even though the initial transmission is performed with respect to the final target BLER, the UE may transmit a NACK together with the CSI. If the initial transmission is not performed with respect to the final target BLER, the UE may transmit the NACK with no CSI. For example, when the final target BLER is $10^{-6}$, the base station may transmit a signal aiming at a BLER of $10^{-6}$ from the first transmission or transmit multiple signals aiming at a BLER of $10^{-2}$. In this case, the base station may inform the UE of the above fact. If the UE fails in decoding the signal aiming at the BLER of $10^{-6}$, the UE may transmit a NACK together with the CSI. If the UE fails in decoding the signal aiming at the BLER of $10^{-2}$, the UE may transmit only a NACK. When the base station receives the NACK for the signal aiming at the BLER of $10^{-2}$, the base station may increase the target BLER to $10^{-4}$ in the next transmission to achieve the final target BLER of $10^{-6}$. When the final target BLER is $10^{-6}$, if the UE fails in decoding the signal aiming at the BLER of $10^{-2}$, the UE may transmit the NACK together with the CSI.

This operation may be predetermined in the system. Alternatively, the base station may inform the UE of the operation through higher layer signaling and/or physical layer signaling. Further, the operation may be implicitly determined.

When an ACK is transmitted, the CSI feedback may be performed. When burst transmission occurs occasionally, the CSI transmitted together with the ACK may be used for the next transmission. Such a configuration may be provided by the base station to the UE through higher layer signaling and/or physical layer signaling.

When the base station transmits a CSI request to the UE, the base station may inform the UE of a target BLER and instruct the UE to feed back the CSI corresponding to the target BLER.

In this case, if the UE fails in decoding DL transmission, the UE may be configured to implicitly report the CSI with respect to a target BLER lower than previous CSI feedback, for example, with respect to the final target BLER while transmitting a NACK. In addition, the UE may also report the target BLER of the reported CSI. Further, to reduce the number of bits used for reporting, the UE may report a difference between the target BLER indicated by the base station and the actually reported target BLER, for example, an index difference between the indicated target BLER and the actually reported target BLER.

If the UE succeeds in decoding, the UE may or may not transmit an ACK together with the CSI according to the configuration of the base station or an implicit rule (operation). When the UE report both the ACK and the CSI, the UE may report the CSI with respect to the final target BLER or feed back the CSI with the same target BLER as that of a previous CSI report. Whether the UE reports the CSI with respect to the final target BLER or the target BLER of the previous CSI report may be predefined in the system or provided by the base station to the UE through higher layer signaling and/or physical layer signaling.

The base station may inform the UE whether the CSI is transmitted together with the HARQ-ACK through higher layer signaling and/or physical layer signaling. In this case, the base station may determine whether the CSI is transmitted together with the HARQ-ACK by considering the HARQ-ACK transmission performance of a UE's UL control channel.

When the CSI is reported, multiple pieces of CSI may be simultaneously reported for multiple target BLERs. In this case, an absolute value may be given to CSI corresponding to one reference target BLER, and for the remaining CSI, differences from the absolute value may be transmitted. For example, an absolute value may be given to the CSI corresponding to the final target BLER, and other CSI corresponding to the remaining target BLERs may be transmitted using differences from the CSI corresponding to the final target BLER.

It may be considered that the base station implicitly informs the UE of the target BLER for the CSI feedback. For example, the target BLER may be implicitly mapped to a numerology corresponding to scheduled data transmission, a service type, or the number of times of retransmission, and then the CSI may be reported based thereon.

When the UE feeds back a CSI value based on a target BLER indicated by the base station, if the CSI value corresponding to the target BLER indicated by the base station is 'out of range', the UE may transmit non-out-of-range CSI among multiple pieces of CSI corresponding to target BLERs higher than the indicated target BLER and also feed back a difference between a target BLER corresponding to the CSI and the indicated target BLER. For example, the UE may feed back a difference between the index of the target BLER corresponding to the CSI and the index of the target BLER indicated by the base station. Here, the term "out of range" may mean that there is no modulation coding scheme (MCS) and no code rate capable of satisfying the target BLER indicated by the base station among CSI indices defined in the system.

TABLE 1

| Target BLER | Target BLER index | CQI index |
| --- | --- | --- |
| $10^{-6}$ | 0 | 0 (out of range) |
| $10^{-5}$ | 1 | 0 (out of range) |
| $10^{-4}$ | 2 | 1 |
| $10^{-3}$ | 3 | 2 |
| $10^{-2}$ | 4 | 4 |

Referring to Table 1, for example, when the base station instructs the UE to feedback a CQI index corresponding to a target BLER of $10^{-6}$, if the corresponding CQI index is 0 as shown in Table 1, that is, if CSI corresponding to the target BLER of $10^{-6}$ is out of range, the UE may feed back a CSI value corresponding to a target BLER of $10^{-4}$ having a non-zero CQI index among target BLERs higher than the target BLER of $10^{-6}$ indicated by the base station and also transmit a difference between the index of the target BLER of $10^{-4}$ and the index of the target BLER of $10^{-6}$, i.e., 2. In this case, the target BLER corresponding to the CSI reported by the UE to the base station may not necessarily be the lowest target BLER among target BLERs with the non-zero CQI value. That is, the CSI may be reported based on a high target BLER. Referring again to Table 1, in the above example, the UE may feed back a CSI value corresponding to a target BLER of $10^{-3}$ together with an index difference between the target BLER of $10^{-6}$ and the target BLER of $10^{-3}$, 3.

When the difference is reported in the above example, an index corresponding to the difference may be reported. To this end, new indices may be defined with respect to differences.

When the UE repeatedly transmits or receives data, the UE may transmit or receive the HARQ-ACK for early termination thereof while repeating the data transmission or reception. To early terminate repeating the data transmission or reception, the UE may be allocated at least one HARQ-ACK resource for a transport (transmission) block (TB) where transmission is repeated, and the at least one HARQ-ACK resource may be allocated across multiple time resources such as multiple slots, multiple mini-slots, etc.

The HARQ-ACK may be transmitted in the meantime for the early termination, that is, to terminate the repeated transmission on the TB. However, if a NACK is transmitted for the TB, the UE may report to the base station the NACK together with the CSI as described above.

When the NACK transmission is performed together with the CSI feedback, the corresponding feedback may be feedback for a wideband CQI. In this case, the feedback may be performed only on a resource configured to the UE for data transmission corresponding to the HARQ-ACK. That is, if the resource configured to the UE for the data transmission is 25 resource blocks (RBs) although the system bandwidth or a UE's bandwidth part is 100 RBs, the wideband CQI may be calculated only for the configured 25 RBs. In this case, the 25 RBs may be consecutive or non-consecutive.

Assuming that hopping is applied to the configured resources, the wideband CQI may be calculated by considering the hopping applied to the configured resources. That is, the wideband CQI may be calculated as the average of CQIs in other subbands.

To this end, two or more HARQ-ACK resources may be configured for the early termination, and the resources may be divided and used for NACK+CSI transmission. When the NACK is to be transmitted together with the CSI, only the CSI may be transmitted by dropping the NACK. In other words, when the UE transmits the CSI, it may be implicitly regarded to mean that the NACK response is contained. No CSI may be included in ACK transmission. However, in this case, if CSI is transmitted, the base station may regard that the CSI is reported since the response for data corresponds to a NACK. Thus, this may be more efficient in terms of signaling overhead. However, when CSI is capable of being transmitted in ACK transmission, transmitting a NACK signal explicitly may be more desirable in terms of accuracy.

Depending on whether an RS is transmitted for each mini-slot, mini-slot set, or slot, the number of available REs may vary. However, since the MCS may be determined based on the number of available REs, the base station and UE may require the same assumption for the number of available REs.

Thus, the number of available REs in each mini-slot may be always determined by assuming that specific signals such as the RS are transmitted, or the number of available REs in each mini-slot may be determined by assuming that no specific signals are transmitted. In addition, although it is assumed that the specific signals are transmitted, the number of available REs may be determined by multiplying a specific ratio, which depends on the communication environment.

Figure 10:
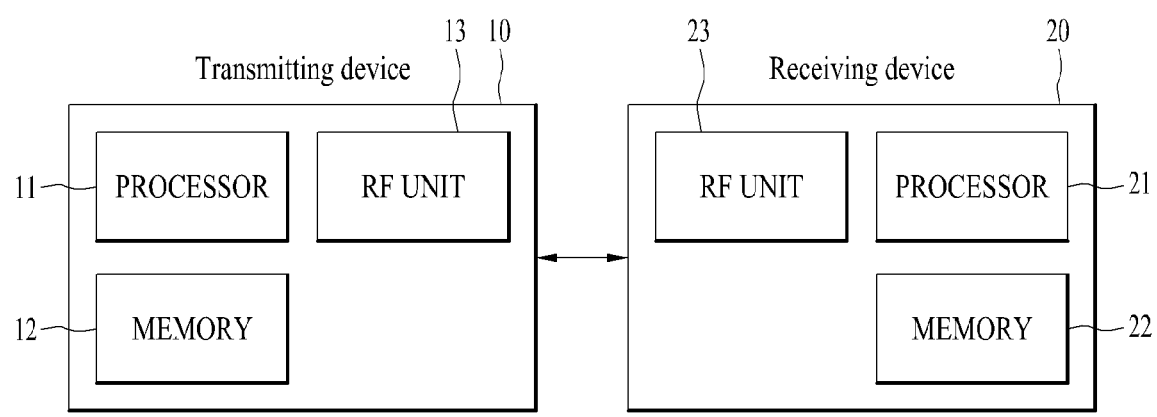
FIG. 10 is a diagram illustrating components of a transmitting device 10 and a receiving device 20 for implementing the present disclosure.

FIG. 10 is a block diagram of a transmitting device 10 and a receiving device 20 configured to implement exemplary embodiments of the present disclosure.

Referring to FIG. 10, the transmitting device 10 and the receiving device 20 respectively include RF unit 13 and 23 for transmitting and receiving radio signals carrying information, data, signals, and/or messages, memories 12 and 22 for storing information related to communication in a wireless communication system, and processors 11 and 21 connected operationally to the RF unit 13 and 23 and the memories 12 and 22 and configured to control the memories 12 and 22 and/or the RF unit 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF unit 13 and 23 include one or more antennas. An antenna performs a function of transmitting signals processed by the RF unit 13 and 23 to the exterior or receiving radio signals from the exterior to transfer the radio signals to the RF unit 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In the present disclosure, the RF units 13 and 23 may support reception BF and transmission BF. For example, the RF units 13 and 23 may be configured to perform the functions described above with reference to FIGS. 5 to 8. In addition, each of the RF units 13 and 23 may be referred to as a transceiver.

In embodiments of the present disclosure, a UE operates as the transmitting device 10 on UL and as the receiving device 20 on DL. In embodiments of the present disclosure, a gNB operates as the receiving device 20 on UL and as the transmitting device 10 on DL. Hereinafter, a processor, an RF unit, and a memory provided in the UE are referred to as a UE processor, a UE RF unit, and a UE memory, respectively, and a processor, an RF unit, and a memory provided in the gNB are referred to as a gNB processor, a gNB RF unit, and a gNB memory, respectively.

The gNB processor according to the present disclosure may indicate the value of k for the UE to configure a reference resource. In addition, the gNB processor may control the transceiver of the gNB to transmit data to the UE on a mini-slot basis and to receive CSI on a mini-slot set basis. Further, the gNB processor may provide the UE with information about a target BLER which is the reference for data transmission. In this case, the target BLER provided to the UE may be a final target BLER.

The UE processor according to the present disclosure may configure a plurality of mini-slot sets included in a slot N−k as a reference resource and control the transceiver to report to the gNB all pieces of CSI for the plurality of mini-slot sets, which is generated based on the reference resource, at any one time point within a slot N. In this case, each of the plurality of mini-slot sets may include a plurality of mini-slots, and the length thereof may be determined based on a channel coherence time. In addition, k is an integer configured by the gNB processor.

When reporting the CSI, the UE processor may report the index of a mini-slot set corresponding to each piece of CSI together. If a mini-slot included in the mini-slot set is not for data transmission, the UE processor may not configure the corresponding mini-slot set as the reference resource but configure a mini-slot set including a mini-slot located before the mini-slot as the reference resource.

The assumption for the number of symbols in the configured reference resource may be determined based on the number of symbols included in a shortest mini-slot among the plurality of mini-slots included in the slot.

Meanwhile, the CSI may be generated based on the target BLER indicated by the gNB. If the UE fails to decode data transmitted based on the target BLER, the UE may generate the CS) based on another target BLER, which is lower than the target BLER, and report a difference between the two target BLERs together.

When reporting the CSI, the UE processor may transmit the HARQ-ACK for data received in the mini-slot set corresponding to each piece of CSI. Only when the HARQ-ACK is a NACK, the UE processor may transmit the CSI. If the UE processor fails in decoding data transmitted based on the final target BLER, the UE processor may transmit the CSI together with a NACK therefor.

Meanwhile, when the HARQ-ACK is an ACK, the UE processor may transmit only the ACK without the CSI. When the HARQ-ACK is the NACK, the UE processor may report only the CSI without the NACK.

The gNB processor or the UE processor may be configured to implement the present disclosure on a cell operating in a high frequency band above 6 GHz where the analog or hybrid BF is applied.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give the broadest scope consistent with the new principles and features disclosed herein.

INDUSTRIAL APPLICABILITY

Although the CSI reporting method and apparatus therefor are described based on the NR system, the method and apparatus are applicable to various wireless communication systems as well as the NR system.

What is claimed is:

1. A method of reporting channel state information (CSI) by a user equipment (UE) in a wireless communication system, the method comprising:
receiving first information related to a slot N for CSI reporting;
receiving second information related to CSI-Reference Resource (CSI-RS) within at least one slot;
determining a slot N−k among the at least one slot as a reference resource,
wherein the slot N−k includes a plurality of mini-slot sets including a plurality of mini-slots; and
reporting, to a base station (BS), all CSIs for the plurality of mini-slot sets via a slot N, wherein the CSIs are measured based on CSI-RS within the reference resource,
wherein each of the CSIs comprises an index of a mini-slot set corresponding to the CSI, and
wherein k and N each is an integer.

2. The method of claim 1, wherein the CSIs for the plurality of mini-slot sets are simultaneously reported to the base station in the slot N.

3. The method of claim 1, wherein a length of each of the plurality of mini-slot sets is configured based on a channel coherence time related to a channel variation between the base station and the UE.

4. The method of claim 1, wherein an assumption for a number of symbols in the reference resource is determined based on a number of symbols included in a shortest mini-slot among a plurality of mini-slots included in a slot.

5. The method of claim 1, wherein based on that a mini-slot included in a mini-slot set is not for data transmission, the mini-slot set is excluded from the reference resource.

6. The method of claim 5, wherein a mini-slot set including a mini-slot located before the mini-slot is configured as the reference resource.

7. The method of claim 1, wherein the CSIs for the plurality of mini-slot sets are generated based on a first target block error rate (BLER) obtained from the base station.

8. The method of claim 7, wherein based on failure in decoding data transmitted based on the first target BLER, the CSIs are generated and reported based on a second target BLER lower than the first target BLER, and wherein a difference between the first target BLER and the second target BLER is reported together.

9. The method of claim 7, wherein based on that a value of CSI related to the first target BLER indicates that there is no modulation coding scheme (MCS) and no code rate satisfying the first target BLER, the CSIs are generated and reported based on a third target BLER higher than the first target BLER, and wherein a difference between the first target BLER and the third target BLER is reported together.

10. The method of claim 1, wherein the CSIs for the plurality of mini-slot sets are transmitted together with hybrid automatic repeat request-acknowledgements (HARQ-ACKs) for the plurality of mini-slot sets.

11. The method of claim 10, wherein based on failure in decoding data transmitted based on a final target block error rate (BLER), CSI for a mini-slot set related to the data is transmitted together with a negative-acknowledgement (NACK) signal for the data.

12. The method of claim 10, wherein based on that a HARQ-ACK for each of the plurality of mini-slot sets is a NACK, CSIs for mini-slot sets corresponding to a NACK are transmitted together.

13. The method of claim 1, wherein based on that a hybrid automatic repeat request-acknowledgement (HARQ-ACK) for each of the plurality of mini-slot sets is an ACK, only the ACK is transmitted, and wherein based on that the HARQ-ACK for each of the plurality of mini-slot sets is a negative-acknowledgement (NACK), only the CSIs for the plurality of mini-slot sets are transmitted.

14. A user equipment (UE) for reporting channel state information (CSI) in a wireless communication system, the UE comprising:

a transceiver configured to transmit and receive a signal to and from a base station (BS); and a processor connected to the transceiver, the processor configured to:

control the transceiver to receive first information related to a slot N for CSI reporting;

control the transceiver to receive second information related to CSI-Reference Resource (CSI-RS) within at least one slot;

determine a slot N−k among the at least one slot as a reference resource, wherein the slot N−k includes a plurality of mini-slot sets including a plurality of mini-slots; and control the transceiver to report, to the BS, all CSIs for the plurality of mini-slot sets via a slot N, wherein the CSIs are measured based on CSI-RS within the reference resource, wherein each of the CSIs comprises an index of a mini-slot set corresponding to the CSI, and wherein k and N each is an integer.

* * * * *